Patented Oct. 20, 1942

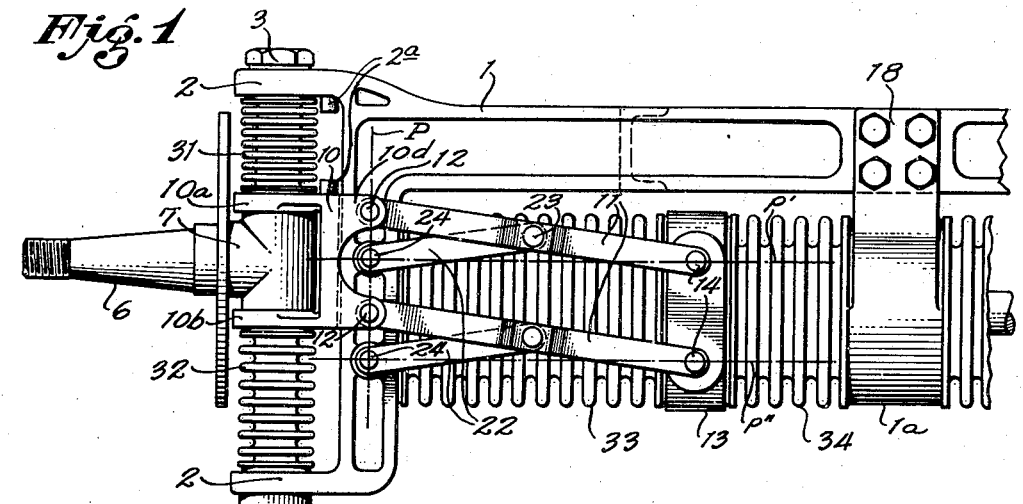
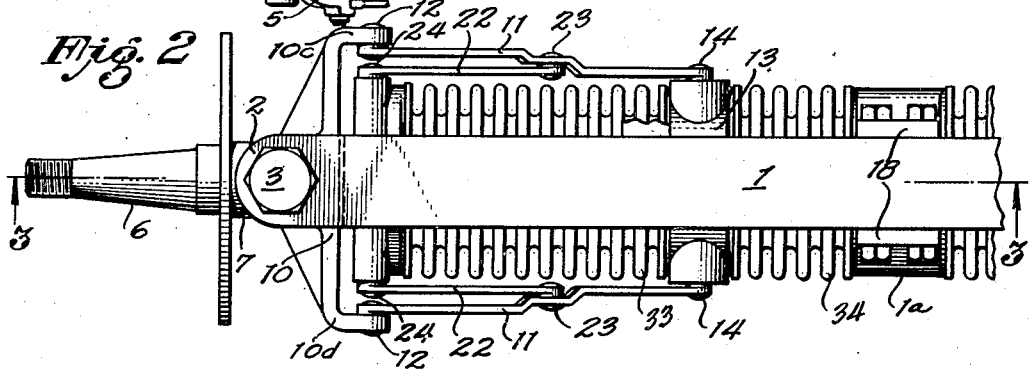
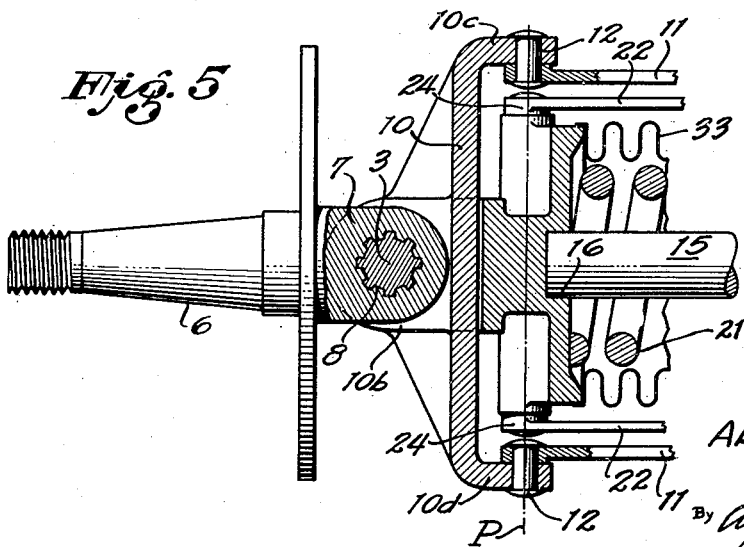

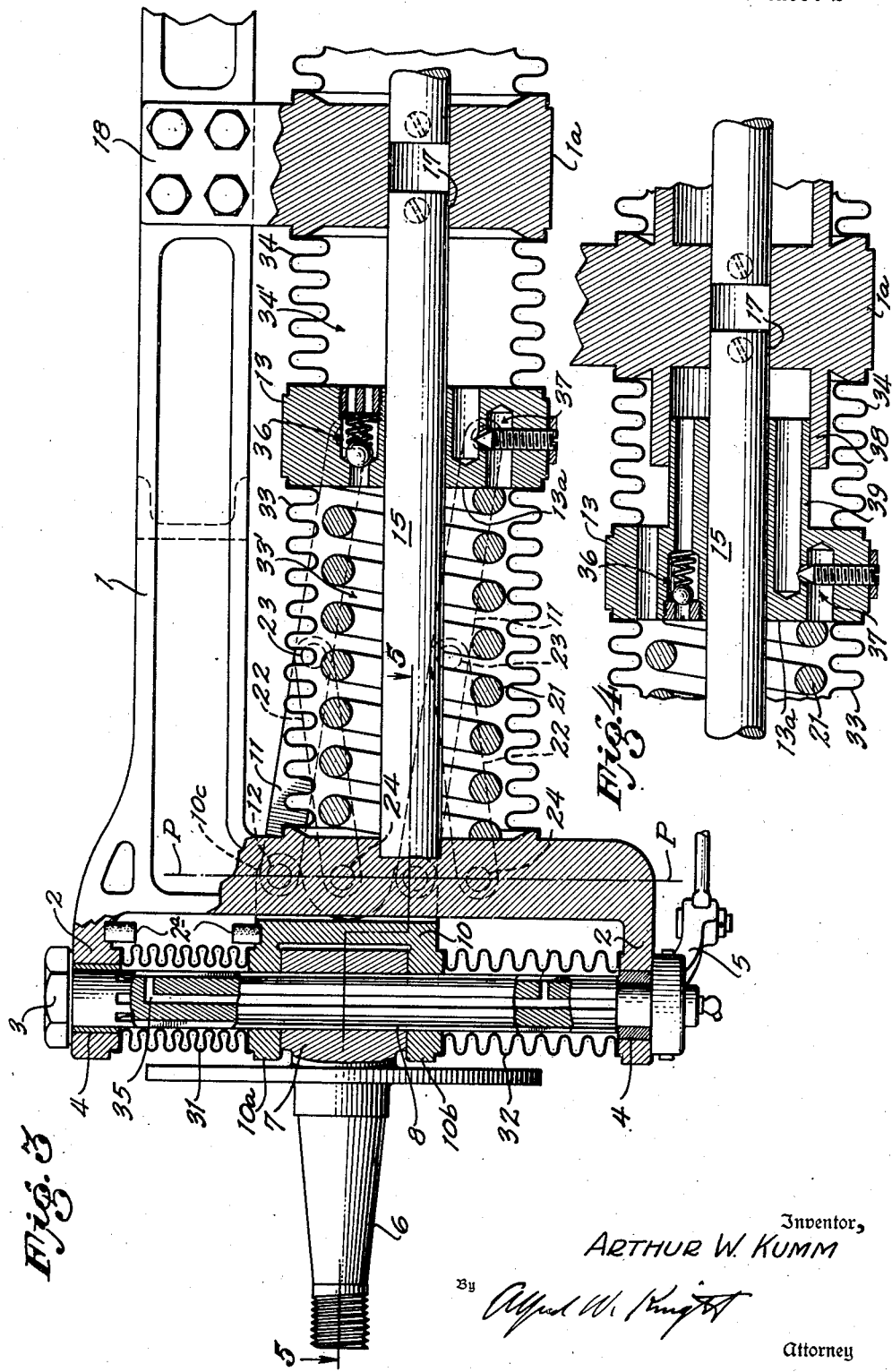

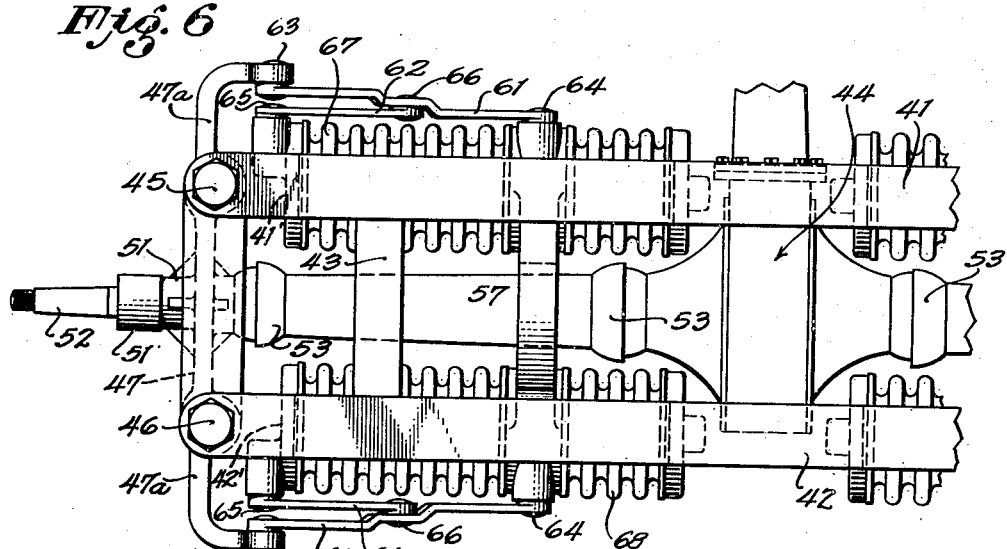
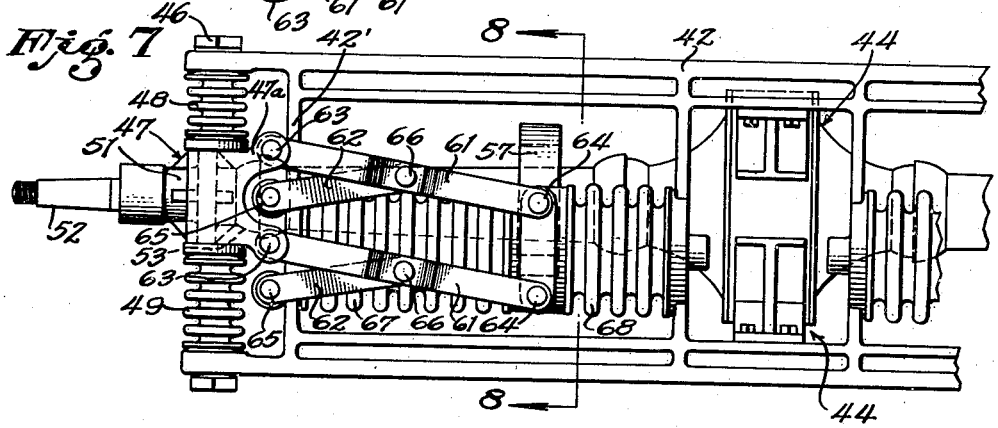
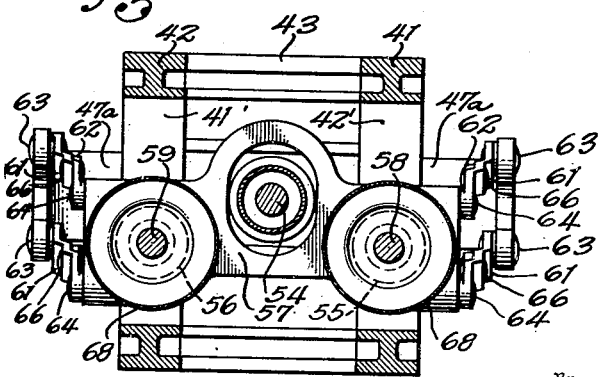

2,299,241

UNITED STATES PATENT OFFICE 2,299,241

INDEPENDENT WHEEL SUSPENSION

Arthur W. Kumm, Los Angeles, Calif.

Application February 23, 1942, Serial No. 431,930

8 Claims. (Cl. 280—96.2)

This invention relates to a novel form of independent suspension wheel assembly for vehicles and the like, and pertains particularly to a form of independent wheel assembly embodying supporting spring means positioned to act along a line transverse to the direction of movement of the axis of the suspended wheel member during operation thereof.

One of the particular objects of the invention is to provide an independent wheel-supporting structure for vehicles and the like, in which supporting spring means are so linked with the wheel as to secure a resultant spring action more comparable to that obtainable by a pneumatic cushion device, in that successive increments of deflection of the wheel under load are opposed by progressively increased restoring forces.

A further object of the invention is to provide an independent wheel-supporting structure in which supporting spring means are so linked with the wheel that the component of force which is impressed upon the wheel is caused to be increased at a rate greater than the rate at which restoring forces are built up in the supporting spring means as a result of the deflection of the wheel from its normal position under load.

A further object of the invention is to provide an independent wheel-supporting structure of the dirigible type such that the camber and caster of the wheel remains constant under all loadings.

A further object of the invention is to provide an independent wheel-supporting spring structure in which there is a minimum of "unsprung" weight.

The construction of the present invention comprises, essentially, an axle member adapted to carry the vehicle wheel, which axle member is mounted for generally vertical movement with respect to the frame of the vehicle, and spring means mounted on the frame and having a movable end portion linked to the axle member in such manner that an upward movement of the axle member with respect to the frame member is opposed by the spring, the link means being so arranged that successive increments of upward movement of the axle member are caused to produce progressively increasing increments of the restoring force in the spring means. The link means are arranged in angular relation to the path of movement of the movable end portion of the spring means in order to effect this desired type of restoring-force augmentation, and the angular relation of the link means to such path of movement is arranged so that the angle therebetween increases upon upward movement of the wheel with respect to the frame under wheel loadings in excess of normal. This change in the angular relation of the link means to the direction in which the spring means are caused to build up the restoring forces also results in a change in the component of such restoring forces which is directly realized at the wheel. More specifically, an annular relation is established such that the component of the spring restoring force which is applied at the wheel is a function of the tangent of this angle.

The construction of this invention is illustrated in the accompanying drawings, in connection with the description of which the above and other features of the invention will be brought out. Referring to these drawings:

Fig. 1 is a front elevation of one embodiment, showing what would be the right front wheel of a conventional construction;

Fig. 2 is a plan view thereof;

Fig. 3 is an enlarged vertical section, as taken on line 3—3 in Fig. 2;

Fig. 4 is a fragmentary detail corresponding to the lower right-hand portion of the construction of Fig. 3, in which a modified ancillary construction has been embodied;

Fig. 5 is an enlarged transverse sectional detail, as taken on line 5—5 of Fig. 3;

Fig. 6 is a plan view of a modified form of the invention arranged to accommodate a drive axle, such as would be represented by the left rear wheel of an automobile or the like;

Fig. 7 is a rear elevation of the form shown in Fig. 6;

Fig. 8 is a transverse section as taken on line 8—8 in Fig. 7; and

Figure 9:
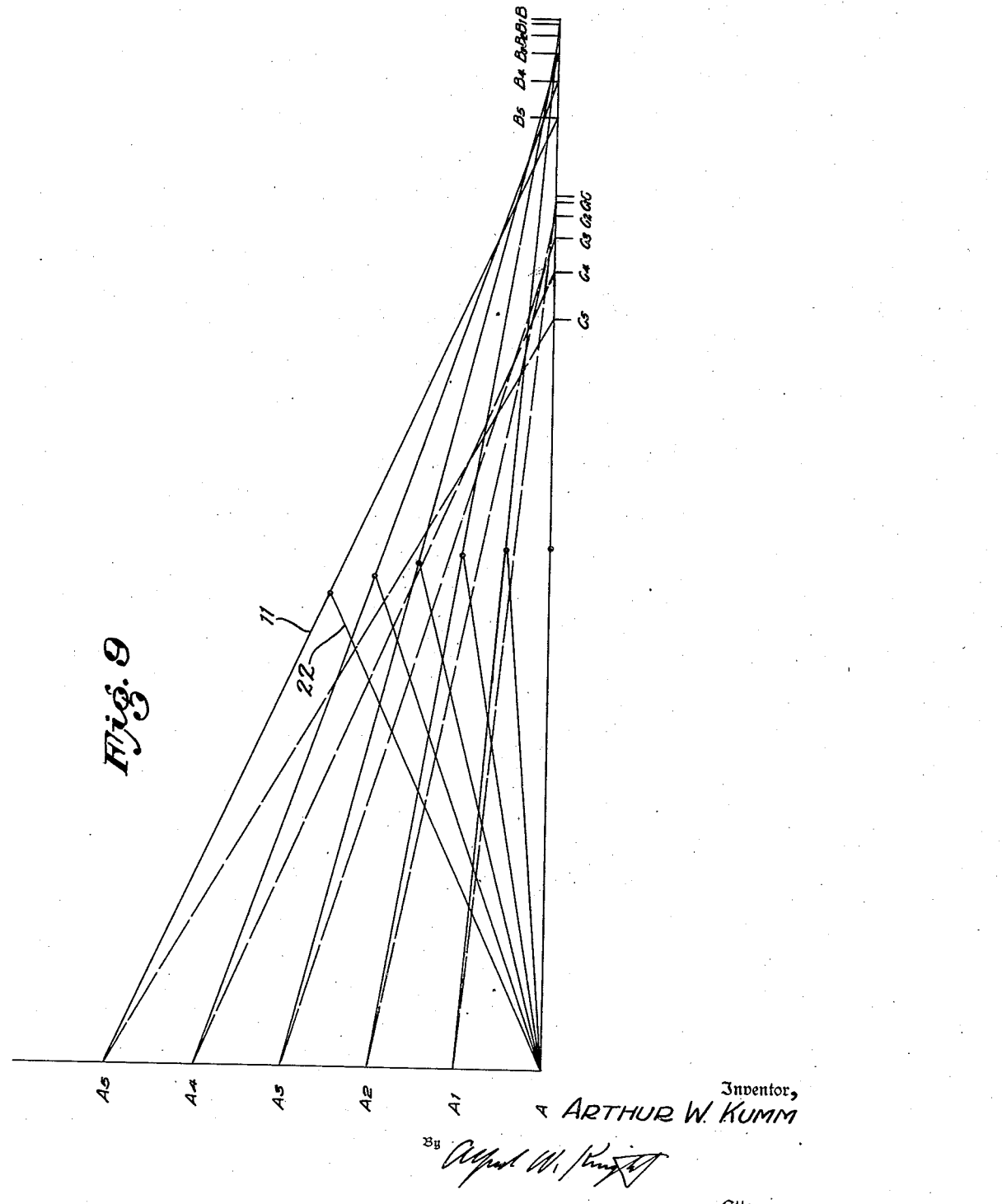
Fig. 9 is a graphic representation of the angular relation which may be obtained between the various structural members of the construction under different conditions, illustrating the magnitude of angular and dimensional changes obtained by the spring linkages.

Referring particularly to Figs. 1–3 and 5, a rigid frame member 1, which may be considered as integral with the main frame structure of the vehicle, is provided in transverse relation to the longitudinal axis of the vehicle, said frame member 1 terminating at its outer ends in a yoke 2 carrying a rotatable kingpin 3 journaled in bearings 4. A steering arm 5 is connected to the lower end of the kingpin. The wheel axle, or spindle 6, is carried on a hub member or bushing 7, which is constrained to rotation with the kingpin 3 in any suitable manner which will allow axial sliding movement therebetween, as through coacting splines or the like shown at 8.

Slidably mounted on the kingpin 3 I provide a crosshead member 10 provided with upper and lower bearing portions 10a and 10b respectively engaging the upper and lower ends of the bushing 7. The kingpin crosshead 10 is provided with inward extending bracket means 10c and 10d to which a plurality of elongated link members 11 are pivotally attached as at 12. The link members 11 are pivotally mounted at their inner ends to a guiding crosshead 13, as at 14, which crosshead 13 is slidably mounted on a guide bar 15 which extends transverse to the axis of the kingpin 3 and is secured at its outer end to the frame member 1 as at 16 and at its inner end to an auxiliary frame member 1a as at 17, said auxiliary frame member 1a being rigidly secured to the frame member 1 in any suitable manner, as at 18. Bumper means of rubber or the like may be provided as at 2a to prevent upward movement of the crosshead 10 to an extent such that the enclosing "Sylphon" bellows (described below) would be crushed.

The supporting spring means for the vehicle wheel carried by the spindle 6 may comprise a compression spring 21 extending coaxially with the guide bar 15, bearing at its outer end against the depending portion of the yoke 2 of the frame member 1 as at 16 and at its inner end against the outward directed face 13a of the guide crosshead 13. In order to establish a high degree of rigidity in the structure I preferably employ two pairs of links 11, one pair at the forward side of the guide bar 15 and the other pair at the rearward side of said guide bar. The inward ends of links 11 of each pair may be attached to the crosshead 13 in symmetrical relation to the path of movement of the crosshead, as defined by the guide bar 15. I further preferably provide, for each of the links 11, an auxiliary link 22 pivotally connected to the mid-point of the link 11 at its inner end 23 and pivotally connected to the yoke 2 at its outer end. The links 22 are exactly one-half the length of the links 11 and the outer ends thereof 24 will be pivoted to the yoke 2. The pivotal attachment of the outer ends 24 of the links 22 will be established at the intersection of the planes of movement of the pivotal axes at points 12 and 14 in the respective pairs of links. More specifically the planes of movement of the pivot points 12 are indicated by the dot-dash line P in Figs. 1 and 5 and the planes of movement of the respective pivotal axes of the pivot points 14 are indicated by the dot-dash lines $p'$ and $p''$ in Fig. 1. Owing to the rectilinear relations which are established by the links 11 and the half links 22, it will be appreciated that the axis of the guide bar 15 will have to be perpendicular to the axis of the kingpin 3, inasmuch as the pivot points 12 are constrained to movement in parallelism with the axis of the kingpin 3.

Upon upward movement of the spindle 6 and the bushing 8 along the kingpin 3 (as would be occasioned by the vehicle striking a bump in the road) the kingpin crosshead 10 will be moved upward therewith. Upward movement of the crosshead 10 will, through the links 11, cause an inward movement of the crosshead 13, which movement is opposed by the compression spring 21.

In this construction the kingpin 3 and the bushing or hub member 7 constitute cooperating guide means for the spindle 6 in its upward and downward movement with respect to the frame members 1, which movement is communicated to the crosshead 13 through the crosshead 10 and the links 11.

By virtue of the angular relationship established between the path of movement of the free end of the spring 21 (along the guide bar 15) and the links 11, the resultant outward movement of the guide crosshead 13 will increase rapidly with successive increments of deflection of the wheel spindle 6 under load. The type of movement obtained will be appreciated when it is realized that the vertical movement of the kingpin crosshead 10 corresponds to changes in the sine of the angle between the link 11 and the bar 15, while the transverse movement of the free end of the spring 21 corresponds to changes in the cosine of this angle. The character of this movement is diagrammatically illustrated in Fig. 9 in which the line A—B corresponds to the line of movement of a pivot 14 and the line A—A₅ corresponds to the line of movement of the corresponding pivot point 12 of a particular length link 11. The scale of Fig. 9 is so selected that when progressive one inch deflections of the wheel axis (as defined by the spindle 6) are plotted at $A_1$, $A_2$, $A_3$, $A_4$, and $A_5$, the respective corresponding positions of the pivot point 14 at the inner end of the link will be such as are indicated at $B_1$, $B_2$, $B_3$, $B_4$, and $B_5$ for a link of twelve inches in length, the point B indicating the position of the pivot 14 when the pivot point 12 at the outer end of the link 11 is aligned with the pivot point 24 at the outer end of the link 22, as at the point A. Corresponding positions where a link 11 of ten inches in length is employed are shown at $C_1$, $C_2$, $C_3$, $C_4$, $C_5$, and C.

Taking a twelve-inch link, for example, it will be noted that the outward movement of the inner end of the link 11 through positions B—B₅, in response to the upward deflections indicated from A to A₅, increases progressively, each increment of movement being greater than the preceding increment. The restoring force which would be built up in a spring member at the inner end of the link 11 would, according to Hooke's Law, be directly proportional to the indicated displacements. At the same time the component of downward force at the outer end of the link 11 will be a function of the angle between the link and the base line A—B which is referred to as $\theta$ in the accompanying table. This function is that of the tangent of this angle, and it will be appreciated that the resultant downward force at the outer end of the link 11 will increase very rapidly inasmuch as both the tangential component and the restoring force in the spring means additively contribute to this total downward force.

The downward force produced at the outer end of the link 11 may be expressed by the following equation, $F = \tan \theta \, [(kD) + L]$, where $k$ is the constant of the spring, $D$ is the deflection of the free end of the spring measured by the outward movement of the inner end of the link, and $L$ is the restoring force which is exerted by the spring when the inner end of the link 11 is at its maximum inward opsition, i. e., the "preloading" of the spring.

In Fig. 9 I have also illustrated the respective positions of the half link 22 in connection with the twelve-inch length link 11 at various angles of inclination of said link 11.

The following table illustrates the various downward forces (termed "wheel loading")

which may be produced with the ten-inch and twelve-inch links, with a spring factor $k$ of 2,000 pounds per inch, and for the twelve-inch length, a value of 3,500 pounds for L, and for the ten-inch length, values of 2,500 pounds and 3,500 pounds for L.

| Link length | Wheel axis deflection | $\theta$ | Tan $\theta$ | Spring compression | 2000#/inch spring factor | | |
|---|---|---|---|---|---|---|---|
| | | | | | Spring loading | | Wheel loading |
| | | | | | 2500# preload | 3500# preload | |
| *Inches* | *Inches* | | | *Inches* | *Pounds* | *Pounds* | *Pounds* |
| 12 (A—B) | 0 | A—B—A | 0.00 | 0.00 | ------ | 3,500 | 00 |
| 12 (A₁—B₁) | 1 (A—A₁) | A—B₁—A₁ | 0.0833 | 0.06 (B—B₁) | ------ | 3,620 | 315 |
| 12 (A₂—B₂) | 2 (A—A₂) | A—B₂—A₂ | 0.1694 | 0.19 (B—B₂) | ------ | 3,880 | 656 |
| 12 (A₃—B₃) | 3 (A—A₃) | A—B₃—A₃ | 0.2583 | 0.41 (B—B₃) | ------ | 4,320 | 1,118 |
| 12 (A₄—B₄) | 4 (A—A₄) | A—B₄—A₄ | 0.3550 | 0.73 (B—B₄) | ------ | 4,960 | 1,760 |
| 12 (A₅—B₅) | 5 (A—A₅) | A—B₅—A₅ | 0.4605 | 1.14 (B—B₅) | ------ | 5,780 | 2,680 |
| 10 (A—C) | 0 | A—C—A | 0.000 | 0.000 | 2,500 | ------ | 000 |
| 10 (A₁—C₁) | 1 (A—A₁) | A—C₁—A₁ | 0.1008 | 0.08 (C—C₁) | 2,660 | ------ | 282 |
| 10 (A₂—C₂) | 2 (A—A₂) | A—C₂—A₂ | 0.2047 | 0.23 (C—C₂) | 2,960 | ------ | 606 |
| 10 (A₃—C₃) | 3 (A—A₃) | A—C₃—A₃ | 0.3151 | 0.48 (C—C₃) | 3,460 | ------ | 1,090 |
| 10 (A₄—C₄) | 4 (A—A₄) | A—C₄—A₄ | 0.4386 | 0.88 (C—C₄) | 4,260 | ------ | 1,868 |
| 10 (A₅—C₅) | 5 (A—A₅) | A—C₅—A₅ | 0.5807 | 1.39 (C—C₅) | 5,280 | ------ | 3,066 |
| 10 (A—C) | 0 | A—C—A | 0.000 | 0.000 | ------ | 3,500 | 000 |
| 10 (A₁—C₁) | 1 (A—A₁) | A—C₁—A₁ | 0.1008 | 0.08 (C—C₁) | ------ | 3,660 | 383 |
| 10 (A₂—C₂) | 2 (A—A₂) | A—C₂—A₂ | 0.2047 | 0.23 (C—C₂) | ------ | 3,960 | 811 |
| 10 (A₃—C₃) | 3 (A—A₃) | A—C₃—A₃ | 0.3151 | 0.48 (C—C₃) | ------ | 4,460 | 1,405 |
| 10 (A₄—C₄) | 4 (A—A₄) | A—C₄—A₄ | 0.4386 | 0.88 (C—C₄) | ------ | 5,260 | 2,307 |
| 10 (A₅—C₅) | 5 (A—A₅) | A—C₅—A₅ | 0.5807 | 1.39 (C—C₅) | ------ | 6,280 | 3,647 |

In order that the various sliding parts may be suitably lubricated and that dirt and grit may be excluded, I preferably enclose the same in a suitable flexible envelope, or the like. For example, I have illustrated the use of "Sylphon" bellows as at 31 and 32 above and below the crosshead 10 which enclose the kingpin 3, and as at 33 and 34 inward and outward of the crosshead 13, which enclose the guide bar 15. A suitable passage as at 35 may be provided in the kingpin 3, for transfer of fluid lubricant between the bellows 31 and 32 upon vertical movement of the crosshead 10 along the kingpin 3. The spaces 33' and 34' within the respective bellows 33 and 34 may be filled with a fluid lubricant and utilized as a "shock absorber" or, more properly, a "snubber" which will oppose the inward or "return" travel of the crosshead 13, if desired. As shown in Fig. 3, the crosshead 13 may to this end be provided with check valve means 36 adapted to permit substantially free passage of fluid from space 33' to space 34', together with an adjustable needle valve 37 or the like to restrict the return flow from space 34' to space 33'.

Where the operating fluid pressures are of such value as to exceed the safe operating limits of a "Sylphon" bellows, I may employ a more sturdy "snubber" construction, as by means of a cylinder member 38 secured to or forming a part of the frame member 1a, and a cooperating piston member 39 secured to or forming a part of the crosshead 13, as shown in Fig. 4. Valve means 36 and 37 will be provided to control the flow of fluid.

In Figs. 6, 7, and 8 I have shown an adaptation of the construction to a non-dirigible drive construction. In this construction two generally parallel transverse frame members 41 and 42 are provided, which are maintained in spaced relation in the direction of the travel of the vehicle through the agency of a brace member 43 at each end. The frame members 41 and 42 may be connected together rigidly at their center portions through the agency of the differential customarily employed in automotive vehicle constructions, as at 44. In line with the respective frame members 41 and 42, and at each end thereof, I provide a pair of vertical guide bars 45 and 46, upon which a vertically slidable crosshead member 47 is slidably mounted. "Sylphon" bellows are preferably provided to enclose the otherwise exposed portions of the bars 45 and 46, as at 48 and 49, corresponding to the bellows 31 and 32 of Fig. 1. Intermediate the ends of the crosshead member 47 I provide a journal 51 for the axle spindle 52, which spindle is connected to the drive member of the differential through a pair of universals 53 and a shaft member 54.

The spring suspension may comprise two elongated spring members 55 and 56, which preferably extend substantially in the planes defined by the respective frame members 41 and 42, and are buttressed at their outer ends against vertical frame portions 41' and 42' of such frame members. The inner ends of the spring members 55 and 56 are engaged by a guide crosshead 57, slidably mounted on guide bars 58 and 59 corresponding in function to the guide bar 15 above. The crosshead 47 is linked to the crosshead 57 through the agency of link members 61 and 62, corresponding in function to the link members 11 and 22 above, said link members 61 being pivotally mounted as at 63 at their outer ends to the crosshead 47, as through projecting arm portions 47a thereof, and at their inner ends to the crosshead 57 as at 64. The link members 62 are pivotally secured at their outer ends to the respective frame portions 41' and 42', as at 65, and to the mid-point of the length of the associated links 61 as at 66. Enclosures for the guide bars 58 and 59 may be provided, as at 67 and 68, corresponding in function to the members 33 and 34 above.

In this construction the guide bars 45—46 and the crosshead 47 constitute the cooperating guide means for the vertical movement of the axle 52, corresponding to the function of the members 3 and 10 above.

The disclosed invention will be subject to modification dictated or engendered by the specific use to which the construction is put in practice, wherefore I do not consider my invention to be limited to the specific details delineated and described herein, but rather to the scope of the subjoined claims. For example, in constructions where an inclination of the kingpin is desired, it will be appreciated that where half links such as 22 and 62 are employed, it will be necessary to provide an inclination of the guide means for the crosshead 13 or 57 so that the required rectilinear relation between the respective crossheads is preserved. Where the construction is such as to dispense with the use of the half links, this rectilinear relation is not required, and an effective increase in the angle θ may be obtained by an initial inclination of the path of movement of the spring crosshead with respect to that of the kingpin crosshead.

I claim:

1. A wheel assembly for vehicles and the like, which comprises: a frame member; an axle member adapted to carry a vehicle wheel; cooperating guide means on said frame member and said axle member, said guide means comprising two relatively movable guide members adapted for linear sliding relative movement along a generally vertical axis, one of said guide members being constrained to vertical movement with said axle member and the other being secured to said frame member; an elongated spring member having a fixed end engaging said frame member and a free end operatively associated with said axle member; elongated link means pivotally connected at one end to said one guide member and pivotally connected at the other end to the free end of said spring member to provide the operative association thereof with said axle member, said link means being normally inclined downward from said one end to said other end, and said spring member biasing said one guide member and said axle member downward at all positions of normal relative movement of said guide members; and guide means mounted on said frame member and engaging the free end of said spring member to guide the same along a path extending transverse to said axis and at an acute angle with respect to the length of said link means at all positions of normal relative movement of said guide members.

2. A wheel assembly for vehicles and the like, which comprises: a frame member; an axle member adapted to carry a vehicle wheel; kingpin means rotatably mounted on said frame member; a guide member secured to said axle member and slidingly mounted on said kingpin means for movement along a generally vertical axis and constrained to rotation therewith; an elongated spring member having a fixed end engaging said frame member and a free end operatively associated with said guide member; elongated link means pivotally connected at one end to said guide member and pivotally connected at the other end to the free end of said spring member to provide the operative association thereof with said guide member, said link means being inclined downward from said one end to said other end, and said spring member biasing said guide member and said axle member downward at all positions of normal sliding movement of said guide member on said kingpin member; and guide means mounted on said frame member and engaging the free end of said spring member to guide the same along a path extending transverse to said axis and at an acute angle with respect to the length of said link means at all normal positions of said guide member with respect to said kingpin means.

3. A wheel assembly for vehicles and the like, which comprises: a frame member; an axle member adapted to carry a vehicle wheel; cooperating guide means on said frame member and said axle member, said guide means comprising two relatively movable guide members adapted for linear sliding relative movement along a generally vertical axis, one of said guide members being constrained to vertical movement with said axle member and the other being secured to said frame member; an elongated spring member having a fixed end engaging said frame member and a free end operatively associated with said one guide member and said axle member; elongated link means pivotally connected at one end to said one guide member and pivotally connected at the other end to the free end of said spring member to provide the operative association thereof with said axle member, said link means being normally inclined downward from said one end to said other end, and said spring member biasing said one guide member and said axle member downward at all positions of normal relative movement of said guide members; additional elongated link means pivotally connected at one end to the mid-point of said first-named link means and pivotally connected at the other end to said frame means; and guide means mounted on said frame member and engaging the free end of said spring member to guide the same along a path extending transverse to said axis and at an acute angle with respect to the length of said link means at all positions of normal relative movement of said guide members, the pivotal connection of said additional link means to said frame means being established at the intersection of said path with the path of movement of the pivotal connection of said one end of said first-named link means, and said two paths of movement extending perpendicular to each other.

4. A wheel assembly for vehicles and the like, which comprises: a frame member; an axle member adapted to carry a vehicle wheel; cooperating guide means on said frame member and said axle member, said guide means comprising two relatively movable guide members adapted for linear sliding relative movement along a generally vertical axis, one of said guide members being constrained to vertical movement with said axle member and the other being secured to said frame member; an elongated spring member having a fixed end engaging said frame member and a free end operatively associated with said one guide member and said axle member; a pair of elongated link means at each side of said spring member, each link of each pair being pivotally connected at one end to said one guide member and pivotally connected at the other end to the free end of said spring member to provide the operative association thereof with said axle member, each of said links being normally inclined downward from said one end to said other end, and said spring member biasing said one guide member and said axle member downward at all positions of normal relative movement of said guide members; and guide means mounted on said frame member and engaging the free end of said spring member to guide the same along a path extending transverse to said axis and at an acute angle with respect to the length of said link means at all positions of normal relative movement of said guide members.

5. The construction set forth in claim 4, said other guide means comprising a kingpin member rotatably mounted on said frame member, and said one guide means comprising a bushing member carrying said axle member and slidably mounted on said kingpin for rotation therewith, and a bracket member constrained to vertical sliding movement with said bushing member on said kingpin member but in free rotative engagement with said kingpin member, the said one ends of said links being pivotally secured to said bracket member.

6. A wheel assembly for vehicles and the like, which comprises: a frame member; an axle member adapted to carry a vehicle wheel; cooperating guide means on said frame member and said axle member, said guide means comprising two relatively movable guide members adapted for linear sliding relative movement along a generally vertical axis, one of said guide members being constrained to vertical movement with said axle member and the other being secured to said frame member; an elongated spring member having a fixed end engaging said frame member and a free end operatively associated with said one guide member and said axle member; a pair of elongated link means at each side of said spring member, each link of each pair being pivotally connected at one end to said one guide member and pivotally connected at the other end to the free end of said spring member to provide the operative association thereof with said axle member, each of said links being normally inclined downward from said one end to said other end, and said spring member biasing said one guide member and said axle member downward at all positions of normal relative movement of said guide members; additional elongated link means pivotally connected at one end to the mid-point of said first-named link means and pivotally connected at the other end to said frame means; and guide means mounted on said frame member and engaging the free end of said spring member to guide the same along a path extending transverse to said axis and at an acute angle with respect to the length of said link means at all positions of normal relative movement of said guide members, the pivotal connection of said additional link means to said frame means being established at the intersection of said path with the path of movement of the pivotal connection of said one end of said first-named link means, and said two paths of movement extending perpendicular to each other.

7. The construction set forth in claim 6, said other guide means comprising a kingpin member rotatably mounted on said frame member, and said one guide means comprising a bushing member carrying said axle member and slidably mounted on said kingpin for rotation therewith, and a bracket member constrained to vertical sliding movement with said bushing member on said kingpin member but in free rotative engagement with said kingpin member, the said one ends of said links being pivotally secured to said bracket member.

8. A wheel assembly for vehicles and the like, which comprises: a frame member; an axle member adapted to carry a vehicle wheel; cooperating guide means on said frame member and said axle member, said guide means comprising two relatively fixed spaced guide members disposed at opposite sides of said axle member and a relatively movable guide member secured to said axle member and adapted for sliding movement with respect to said first-named guide members along a generally vertical axis; two elongated spring members, each having a fixed end engaging said frame member adjacent one of said relatively fixed guide members and a free end operatively associated with said relatively movable guide member, said spring members extending generally parallel to said axle member; elongated link means pivotally connected at one end to said relatively movable guide member and pivotally connected at the other end to the free end of said spring members to provide the operative association of said spring members with said axle member through said movable guide member, said spring members biasing said movable guide member and said axle member downward at all positions of relative movement of said guide members; and guide means mounted on said frame members and engaging the free ends of said spring members to guide the same along respective paths, each extending transverse to said axis.

ARTHUR W. KUMM.